Patented Oct. 13, 1936

2,057,382

UNITED STATES PATENT OFFICE 2,057,382

CEMENT MORTAR

Howard F. Kichline, Catskill, N. Y., assignor to North American Cement Corporation, Catskill, N. Y., a corporation of Delaware No Drawing. Application April 8, 1935, Serial No. 15,284

7 Claims. (Cl. 106—24)

This invention relates to improvements in lime cement mortars of the premixed type and to an improved method of manufacture thereof.

In the use of premixed lime and cement mortars, it has been found that certain qualities are desirable. The mortar must have adequate strength and it should be workable so that the mason will be able to do the maximum amount of quality work with the least fatigue. Most cement mortars which are easily workable, however, are usually weak, and the high strength mortars are invariably very poor as to workability. A lime and cement mortar should also have good bonding qualities, be cohesive, spread well and preferably should be water-repellent, but heretofore these qualities have not been possessed by any one product.

It is the object of my invention to provide an improved cement mortar which has properties of easy workability and high strength superior to those of prior products.

Another object of my invention is to provide an improved high strength cement mortar having approximately equal proportions of lime and cement by volume and having of the order of one-eighth of one per cent of a blending or plasticizing agent ground in to improve the workability, said cement mortar being water-repellent and having good spreading qualities.

A further object of my invention is to provide a cement mortar in which the workability and strength are materially improved by having small amounts of a blending or plasticizing agent such as one-eighth of one percent of suitable oil of animal or vegetable origin, or a glyceride, or oleic or stearic acid ground into the lime and cement.

A further object of my invention is to provide an improved method of manufacturing a cement mortar which consists in simultaneously grinding approximately equal volumes of lime and cement with a small amount of a blending agent to increase the ultimate tensile strength of the mortar.

Another object of my invention is to provide an improved method of manufacturing a cement mortar which includes in addition to the step of mixing, the further step of re-grinding the cement and lime together with an oleaginous product such as cottonseed oil, thereby obtaining a more intimate mix and a greater percentage of fines for a more workable and stronger product.

Another object of my invention is to provide a premixed lime and cement mortar which has good bonding qualities, is water-repellent, has high tensile and compressive strength and has a very plastic workability characteristic.

Further objects and advantages of my invention will appear from the following disclosure of a preferred method of manufacturing a lime and cement mortar and of a preferred mortar made thereby, as an example of one embodiment of my invention.

Cement mortars usually include varying percentages of hydraulic cement and hydrated lime and sometimes other ingredients. As the percentages of lime and cement vary over wide ranges, so that many variations of final product are obtained, minimum specifications for a commercial product have been prepared both by the United States Government and The American Society of Testing Materials. These requirements are substantially as follows:

Fineness.— Not to exceed 20% residue on a 200 mesh sieve. (May heat to 100° C. for 1 hr. and resieve.)

Initial set.—Not less than 60 min.

Final set.—Within 48 hours.

Soundness.—Firm, hard, no sign of distortion, cracking or disintegration.

Strength.— Average compressive strength not less than 175 lbs. per sq. in., at 7 days. The strength at 28 days shall not be less than at 7 days.

These are only the minimum requirements however, and commercial products must also have good plasticity, substantially no efflorescence, light color and small water absorptivity. The weight also should preferably be in the order of 60 pounds per cubic foot, which is the size of the common bag in which the cement mortar is sold commercially.

There is also another quality essential to a satisfactorly lime and cement mortar. This is the property of workability, which may be defined as a relationship between cohesiveness, setting and spreading quality. A workable lime and cement mortar must be of such character that the mason can apply it rapidly with minimum fatigue and over the maximum area without cracking or separation of one portion of the mortar from the other during application. The mortar must also be free working and not stick to the mortar board or other tools. In short, it must suit the mason or he will object to its use.

To secure workability in the past it has been customary for the mason or the mortar manufacturer to use a larger portion of lime, which sacrifices ultimate strength. The tensile strength and compressive strength of the lime and cement mortar must, however, be adequate. It is of utmost importance to the building to have a mortar of good strength and the minimum for compressive strength at 7 days is not less than 175 pounds per square inch and at the end of 28 days not less than the strength at 7 days. Higher strength is desirable but further increase in strength has caused a further sacrifice in work ability.

I have found that I can produce an improved cement mortar from lime and cement which when mixed with water and sand in the usual manner, will show very high strength, good workability and other characteristics which are superior to all other cement mortars known to me.

One of the advantages of my invention is that I can obtain, in the same product, high qualities of workability and great strength, without sacrifice of cohesion, bond, or water proofing. I have also found that a small amount of a blending or plasticizing agent, preferably less than one per cent of materials such as oils of vegetable or animal origin, glycerides or oleic or stearic acids render the mix water-repellent, but will assist in increasing the workability while maintaining the strength of the final product.

As an example of my product, I prefer to use 73% of Portland or hydraulic cement with 27% of hydrated lime by weight, which is approximately equivalent to equal parts of lime and cement by volume. In accordance with usual practice, and as set forth in Government specifications, these materials are ground to a fineness of not less than 80% and preferably above 97% at 200 mesh. These ingredients are then preferably mixed intimately with the blending or plasticizing agent.

The blending or plasticizing agent I prefer is cotton-seed oil, and I find that it is best to limit the amount of the blending agent. For best general results I find that one-eighth of one per cent of cottonseed oil is satisfactory. I do not wish to be limited, however, to an oleaginous blending agent such as cottonseed oil as I can use other oils of animal or vegetable origin and other products may be found entirely satisfactory. I have also found that small quantities of calcium stearate, preferably one-eighth of one per cent are entirely satisfactory. It is of course to be understood that I can add stearic acid, which will react to form the stearate and I can also use oleic acid, which reacts to form an oleate. I can also use glycerides if desired.

I have found that although careful mixing of the lime, cement, and blending or plasticizing agent gives a good product, a further grinding in a tube mill will give a much more satisfactory product. This improvement is especially noticeable in the workability quality although the strength is improved also.

In order to show the benefits of my improved lime mortar, tests have been made with lime mortar having the preferred formula and other formulas represented by variations in my invention and by the best commercial products now available. The following tests of the commercial products were selected out of twelve tests conducted to show in one case, the strongest cement mortar, and in the other case, the most workable product. As compared to these products, I show in the following table, Table "A", selected samples of products in accordance with my invention, using the preferred mixtures of 73% cement, 27% lime, and ⅛ of 1% of different blending agents.

Column I of Table "A" represents a workable commercial premixed mortar product represented to be a true cement having no free lime, being permanently water proofed by calcium stearate, and being plastic by virtue of the water proofing. The calcium stearate commonly present in such a product is in excess of 2%.

Column II of Table "A" represents a strong commercial premixed lime mortar product represented to contain standard Portland cement and standard hydrated lime and nothing else. It is characterized by its strength.

Columns III and IV are tests of my improved lime cement mortar, in one case having one-eighth of one per cent of cottonseed oil ground with the lime and cement for 20 minutes, and in the other case one-eighth of one per cent of calcium stearate, similarly ground into the lime and cement for a period of about 20 minutes.

The quality of workability was based on samples submitted to a skilled mason who rated the products in accordance with their ease of application, and their plasticity. The workability was also shown in comparison with the spreadability of the same quantity of each product in building a wall of common brick. In the table it will be seen that similar quantities would cover different numbers of brick.

Table "A"

| Column | I | II | III | IV |
|---|---|---|---|---|
| Ingredients | Commercial A Cement Calcium stearate | Commercial B Cement Lime | 73% cement 27% lime ⅛% cottonseed oil | 73% cement 27% lime ⅛% calcium stearate. |
| Water repellant | Yes | No | Yes | Yes |
| Penetration (Vicat needle) | Bottom | 21 | Bottom | 32 |
| Workability | Very plastic | Poor to fair | Very plastic | Very plastic |
| Bond: | | | | |
|   1 min | O. K. | O. K. | O. K. | O. K. |
|   Several days | Fair | Good | Good | Good |
| Color: | | | | |
|   Several days | Gray | Light | Light | Light |
| Spreading quality | 26 brick | 21 brick | 25 brick | 27 brick |
| Initial set | 4:35 | 5:20 | 2:10 | 2:10 |
| Final set | 7:10 | 9:00 | 5:30 | 5:10 |
| Tensile strength: | | | | |
|   1 day | 0 | 90 | 122 | 137 |
|   7 days | 60 | 210 | 234 | 245 |
|   28 days | 138 | 272 | 300 | 308 |
| Compressive strength: | | | | |
|   1 day | 48 | 393 | 606 | 702 |
|   7 days | 192 | 2,097 | 2,382 | 2,399 |
|   28 days | 793 | 2,466 | 2,805 | 3,168 |
| Soundness | O. K. | O. K. | O. K. | O. K. |

Analysis of Table "A" shows that the workable type of prior commercial product, Column I, is water-repellent, very plastic, has good spreading qualities, but the strength in compression is very little higher than the minimum Government specification. The tensile strength is also very low.

The strong type of prior commercial product, Column II, has unusually high tensile and compressive strength, and at seven days the compressive strength is over twelve times as great as required by minimum specifications. Such a product, although preferable from the strength standpoint, is however so stiff and unworkable that delays in application and objections by the masons would prevent its satisfactory use.

My improved product is described in Columns III and IV. These tests differ in the blending agents, one using calcium stearate and the other using cottonseed oil. In every detail, my product tests better. It is more workable as tested either by spreading quality, penetration by Vicat needle or by actual test of the reaction of a skilled mason who rated the products during application as to plasticity. It is also water-repellent, of good color, sound in all respects and has good bond.

The principal characteristic however is that it is unusually strong. Using either the calcium stearate or the cottonseed oil in amounts of one-eighth of one per cent of the weight of the mortar, the compressive and tensile strength at various periods is greater than the strongest commercial product available and ten to fifteen times as strong as any product which had anywhere near as good workability characteristics.

I believe that these highly superior results are due in some measure to my preferred step of subsequent grinding of all the ingredients together in the tube mill. In further testing of my preferred mixture of 73% cement, 27% lime and ⅓ of 1% of a blending agent, I found that there was substantial difference between materials which had been merely mixed and those which has been reground together. In the following table these results are set out.

The conditions of test of the materials described in the following table, Table "B", differed somewhat from the conditions of prior tests. The material was my improved lime mortar, using the formula of 73% cement, 27% lime and ⅛ of 1% cottonseed oil. These ingredients were first mixed with mortar hoes as well as possible, and samples then taken of the mixed product. The product was then shoveled into a screw conveyor which passed the material into a tube mill of standard type for regrinding. Passage through the tube mill takes as a rule about 20 minutes.

Column I, Table "B", represents the average results obtained by taking samples of the discharge of the tube mill every 15 minutes during the grinding of 5½ tons of cement, lime and cottonseed oil at a rate of 3½ tons per hour.

Column III, Table "B", represents the average results obtained under similar conditions of a production run of 11 tons of material ground at a rate of approximately 4 tons per hour.

Columns II and IV are comparative results of the same materials unground.

*Table "B"*

| Column | I | II | III | IV |
|---|---|---|---|---|
| Rate of grind | 3½ ton/hr. rate. | Not ground. | 4 ton/hr. rate. | Not ground. |
|  | Aug. 28 |  | Sept. 6 |  |
| Initial set | 2:06 | 2:10 | 2:08 | 3:05 |
| Final set | 5:55 | 6:10 | 6:12 | 6:45 |
| Fineness 200 mesh | 98.6 | 95.1 | 98.9 | 97.3 |
| Percent water used | 12.8 |  |  |  |
| Tensile strength: |  |  |  |  |
| 1 day | 166 | 92 | 153 | 102 |
| 7 days | 253 | 215 | 242 | 192 |
| 28 days |  |  | 299 | 271 |
| Compressive strength: |  |  |  |  |
| 1 day | 1006 | 563 | 794 | 548 |
| 7 days | 2616 | 2068 | 2736 | 2249 |
| 28 days |  |  | 3086 | 2978 |

It will be seen that the regrinding improves the product. The percentage of fines is increased and the strength of the product in tension and in compression is much greater.

It will also be noted that the setting time is not materially affected that initial set is sufficiently slow for satisfactory commercial application and that final set is sufficiently quick that good operations will result. All tests of the cement mortar were conducted with a mixture of 1 part premixed mortar with 3 parts by volume, of common sand, sufficient water being added to make a suitable plaster.

The workability of my commercial product containing 73% of cement, 27% of lime and ⅛ of 1% of cottonseed oil by weight is excellent and is superior to the best competitive products tested. When applied in actual use by skilled masons or under penetration tests by the Vicat needle it shows good workability, the penetration varying from 32–135 mm.

The bond after 1 minute is satisfactory and after several days is very good. The test for bond at 1 minute was to butter three bricks and then grasping the middle brick determine whether or not the outside bricks were raised. The tests for bond after several days was to knock the bricks apart with a hammer and is the mortar parted clean from the brick the bond was considered poor. The color of the mortar was found satisfactory in all respects. The spreading quality is also good, in that the same amount of mortar of my preferred mix will cover more bricks than any of the other mortars tested.

To show the benefits of the blending agent, I have made a comparison in the following table, Table "C", of mixtures of lime and cement with varying quantities of a blending agent. In Column I, the general qualities of a mixture which had 73% of cement and 27% lime without a blending agent are set forth. These correspond closely to the characteristics of the competitors' material tested in Column II, Table "A".

Column II, Table "C", shows the characteristics of a material having 1% calcium stearate. While these characteristics are not entirely unsatisfactory, this material is not as good as shown in Column V which is the preferred mixture using one-eighth of one per cent of calcium stearate, or cottonseed oil.

Column III shows that percentages of blending agent over 1% are objectionable. In this case, the bond failed at 1 minute and this is objectionable from the commercial standpoint.

In Column IV of Table "C" the material tested was lime, cement and ¼ of 1% of cottonseed oil. In this case the bond failed at 1 minute and was poor after several days. Such a material is not satisfactory.

The preferred material, Column V, has ⅛ of 1% of calcium stearate or preferably cottonseed oil, and its superiority is clearly shown by the comparison of its tested qualities with the other materials.

*Table "C"*

| Column | I | II | III | IV | V |
|---|---|---|---|---|---|
| Cement | 73 | 72 | 71 | 73 | 73 |
| Lime | 27 | 27 | 26 | 26¾ | 27 |
| Calcium stearate | 0 | 1 | 3 |  | ⅛ of 1% or |
| Cottonseed oil |  |  |  | ¼% | ⅛ of 1% |
| Water repellent | No | Yes | Yes | Yes | Yes |
| Penetration | 19 | 33 | 30 | 30 | 32 |
| Workability | Poor to fair | Plastic | Very plastic | Very plastic | Very plastic |
| Bond 1 min | O. K. | O. K. | Fail | Fail | O. K. |
| Several days | Good | Good | Good | Poor | Good |
| Soundness | O. K. |  |  |  | O. K. |
| Color several days | Light | Light | Light | Light | Light |
| Initial set | 5:20 |  |  |  | 2:10 |
| Final set | 9:00 |  |  |  | 5:10 |

The use of a blending agent of the order of one-eighth of one per cent of the total weight of lime mortar is most satisfactory. Larger amounts tend to reduce the strength and do not increase the workability sufficient to offset this disadvantage.

Regrinding of the lime and cement with the blending agent produces a superior mix. The product has a minimum of efflorescence, is water-repellant and is no more expensive than the prior cement mortars. It also has substantial hardness with necessary elasticity and will not develop surface cracks. Its particular characteristic, however, is its workability which by practical or other test shows very good quality for the strength of final product.

While I have set forth the preferred proportions of my cement mortar, I do not consider that the proportions of 73% cement, 27% lime and ⅛ of 1% of the blending agent are critical to the extent that minor variations therefrom may not be made. My experiences show that some variations can be made with some sacrifice of results and if a cheaper product is required adequate strength (far greater than required) can be obtained by using small amounts of relatively inert fillers which do not involve the expense of either lime or cement.

I therefore desire a broad interpretation of my invention within the scope and spirit of the description herein and of the claims appended hereinafter.

I claim:

1. The method of manufacturing a premixed lime and cement mortar having improved strength and workability characteristics which comprises the steps of mixing ground hydraulic cement, hydrated lime and a blending agent in amounts of approximately 73% cement, 27% lime and ⅛ of 1% blending agent, and re-grinding the same together.

2. A premixed lime and cement mortar of the class described comprising approximately 73 parts by weight of cement, approximately 27 parts by weight of hydrated lime and less than one part of an oily blending or plasticizing agent.

3. A premixed lime and cement mortar of the class described comprising approximately 73 parts by weight of cement, approximately 27 parts by weight of hydrated lime and ⅛ of 1% of an oily blending and plasticizing agent.

4. A premixed lime and cement mortar of the class described comprising approximately 73 parts by weight of cement, approximately 27 parts by weight of hydrated lime and ⅛ of 1% of cottonseed oil.

5. A premixed lime and cement mortar of the class described comprising approximately 73 parts by weight of cement, approximately 27 parts by weight of hydrated lime and ⅛ of 1% of calcium stearate.

6. A premixed lime and cement mortar composition of the class described comprising ⅛ of 1% cottonseed oil, approximately 27% of hydrated lime and approximately 73% of cement, said materials being ground together, and having a fineness on a 200 mesh screen of 97% or more.

7. A premixed lime and cement mortar comprising approximately 73 parts by weight of cement, approximately 27 parts by weight of hydrated lime and less than 1% of an oily blending and plasticizing agent, and having, when mixed with sand in a ratio of 1 to 3 and water, excellent workability, a penetration of the Vicat needle of not less than 32, and having a compressive strength at 7 days in excess of 2000 pounds per square inch and not less at 28 days than 7 days.

HOWARD F. KICHLINE.